United States Patent
Stonestreet, II et al.

(10) Patent No.: US 8,820,683 B2
(45) Date of Patent: Sep. 2, 2014

(54) ELECTROTHERMAL WING ICE PROTECTION SYSTEM

(75) Inventors: Arlie D. Stonestreet, II, Manhattan, KS (US); Harold G. Kraus, Jr., Manhattan, KS (US); Darin E. Genereux, Manhattan, KS (US)

(73) Assignee: Ultra Electronics ICE Inc., Manhattan, KS (US)

( * ) Notice: Subject to any disclaimer, the term of this patent is extended or adjusted under 35 U.S.C. 154(b) by 322 days.

(21) Appl. No.: 13/479,105

(22) Filed: May 23, 2012

(65) Prior Publication Data
US 2012/0318923 A1    Dec. 20, 2012

Related U.S. Application Data

(60) Provisional application No. 61/489,141, filed on May 23, 2011.

(51) Int. Cl.
*B64D 15/12* (2006.01)
*B64D 15/14* (2006.01)

(52) U.S. Cl.
CPC . *B64D 15/12* (2013.01); *Y02T 50/54* (2013.01)
USPC .................................. 244/134 D; 244/134 F

(58) Field of Classification Search
USPC ................. 244/134 R, 134 D, 134 F; 416/95; 219/476; 60/39.093
See application file for complete search history.

(56) References Cited

U.S. PATENT DOCUMENTS

| | | | |
|---|---|---|---|
| 3,648,070 A | 3/1972 | Eicher | |
| 3,721,830 A | 3/1973 | Oishi | |
| 4,348,582 A | 9/1982 | Budek | |
| 5,264,823 A | 11/1993 | Stevens | |
| 5,691,691 A | 11/1997 | Merwin | |
| 7,246,773 B2 * | 7/2007 | Stoner et al. | 244/134 D |
| 7,580,777 B2 * | 8/2009 | Smith et al. | 701/3 |
| 7,708,227 B2 * | 5/2010 | Al-Khalil | 244/134 D |
| 7,854,412 B2 * | 12/2010 | Al-Khalil | 244/134 R |
| 8,430,359 B2 * | 4/2013 | Al-Khalil | 244/134 A |
| 2003/0180145 A1 | 9/2003 | Goldberg | |
| 2005/0007257 A1 | 1/2005 | Rast | |
| 2009/0072091 A1 * | 3/2009 | Al-Khalil | 244/134 A |
| 2010/0243811 A1 * | 9/2010 | Stothers | 244/134 R |
| 2010/0282910 A1 * | 11/2010 | Stothers et al. | 244/134 D |

OTHER PUBLICATIONS

"PCT/US06/44804", PCT International Search Report, (Aug. 30, 2007).

* cited by examiner

*Primary Examiner* — Philip J Bonzell
(74) *Attorney, Agent, or Firm* — Law Office of Mark Brown, LLC; Mark E. Brown

(57) ABSTRACT

An electro-thermal wing ice protection solution controller for managing and controlling electrical power generated to heat and de-ice the wing of an aircraft. The system is comprised of a number of power control modules (PCMs) and at least one master control unit (MCU). These elements can be stacked together and mounted into rack systems in order to provide scalable organized power distribution for a wing de-icing and ice protection system.

24 Claims, 9 Drawing Sheets

ELECTROTHERMAL WING ICE PROTECTION SYSTEM

CROSS-REFERENCE TO RELATED APPLICATION

This application claims priority in U.S. Provisional Patent Application Ser. No. 61/489,141, filed May 23, 2011, which is incorporated herein by reference.

BACKGROUND OF THE INVENTION

1. Field of the Invention

The present invention relates generally to a system for electrically heating and de-icing the wing of an airplane, and more particularly to a system and method for providing power and control through a wing de-icing system in an airplane using stackable, scalable elements.

2. Description of the Related Art

Ice buildup on the wings of aircraft can cause flight delays and flight hazards. Typical wing de-icing systems include multiple individual heating elements spaced about the wing surface of the aircraft. These heating elements are typically powered by electricity. Many aircraft have wing de-icing systems built into the craft, but often these systems are inefficient or under-equipped for the aircraft into which they are installed.

Existing electro-thermal wing de-icing systems are less flexible, unreliable, and inefficient. What is needed is a flexible, scalable, and reliable wing ice protection system solution for the next generation of more electric aircraft.

More information can be found in U.S. Pat. No. 7,602,081 which is incorporated herein by reference.

Heretofore there has not been available an electrothermal wing ice protection system with the features and elements of the present invention.

BRIEF SUMMARY OF THE INVENTION

The present invention relates to an electro-thermal wing ice protection solution controller for managing and controlling electrical power generated to heat and de-ice the wing of an aircraft. The system is comprised of a number of power control modules (PCMs) and at least one master control unit (MCU). These elements can be stacked together and mounted into rack systems in order to provide scalable organized power distribution for a wing de-icing and ice protection system.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

An embodiment of the present invention is generally designed to interface with an aircraft's electrical and control systems to implement an "ice protection control law" to control and operate the ice protection system which prevents ice from forming on the aircraft's wings.

II. Wing Ice Protection System 2

Figure 1:
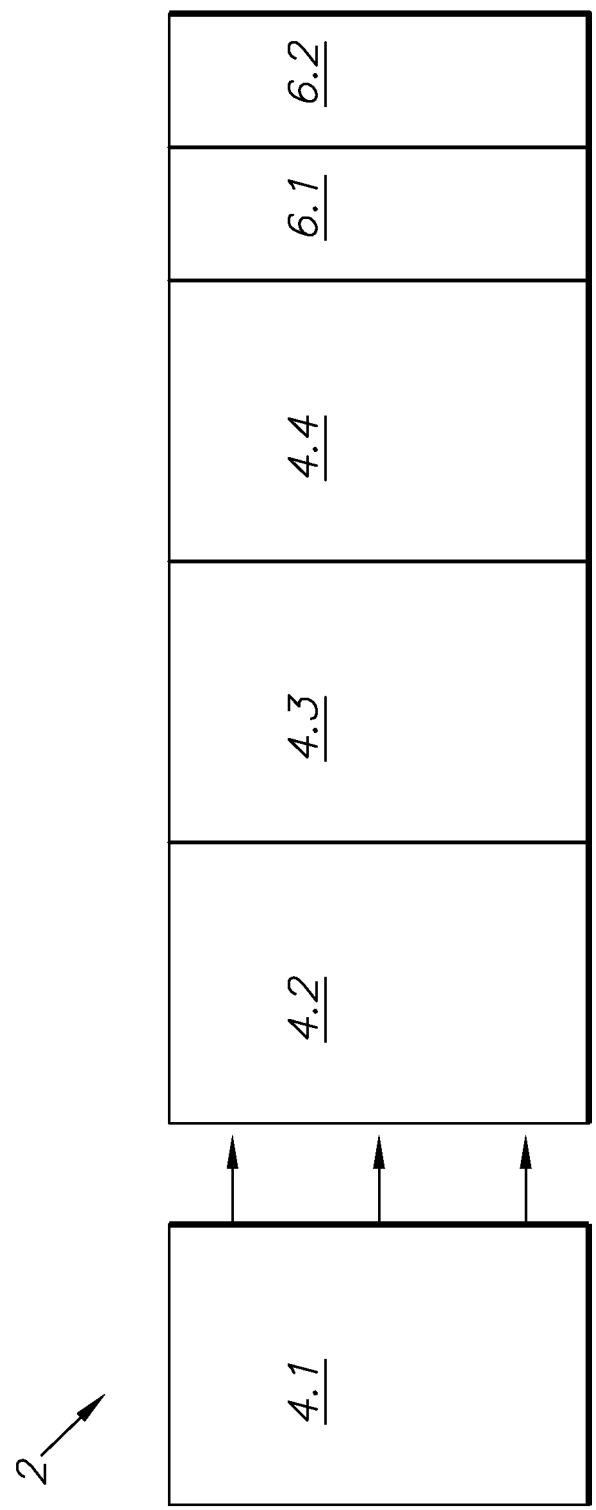
FIG. 1 is a block diagram representing the scalable nature of an embodiment of the present invention.

Referring to the drawings in more detail, the reference numeral 2 generally indicates a wing ice protection system. This system is primarily comprised of a number of power control modules (PCMs) 4 and at least one master control unit (MCU) 6. As shown in FIG. 1, the PCMs 4 and MCU 6 can be stacked and scaled for aircraft of different size and differing requirements. It should be noted that heating elements may be contained within other surfaces of an aircraft, and the present invention is capable of energizing any heating element located within the surface of an aircraft.

The PCMs 4 provide power to the individual heating zones located on the wings of the aircraft (not shown). The PCM units are scalable, ideally in increments of 4 zones per line-replaceable unit (LRU), to accommodate any number of zones required for ice protection. The PCMs 4 use a modern solid-state proportional control design to deliver the exact amount of power needed, and only when desired or requested by the MCU 6. The solid state design provides for high reliability and efficiency over conventional mechanical or pneumatic systems. Each PCM 4 contains extensive built-in-test and the ability to provide fault isolation in the event of critical controller or system failures without affecting the remaining non-faulted zones, thus providing N+1 redundancy and high system availability. In addition, the PCM architecture embodies an asymmetric proof design to eliminate the possibility of asymmetric icing failure conditions.

Each PCM 4 may be linked to a single heating zone or multiple heating zones. The ice protection system 2 could be arranged such that each PCM feeds output to a single heating zone on the right wing of an aircraft while also feeding output to the mirror-imaged zone on the left wing. In the case of fault or failure of a single PCM, such an arrangement would prevent asymmetrical heating which could destabilize the plane during flight.

The MCU 6 interfaces with the aircraft's systems 7 and is responsible for implementing the ice protection control law. The MCU can be used in dual redundant arrangement as shown in FIGS. 1-6, to provide for enhanced availability and to satisfy high-level system safety requirements. Each MCU in a dual arrangement may be kept in separate housings interfaced together, or the components may share a single housing.

Each PCM and MCU contains a number of fault sensors, temperature sensors, and other sensors for determining failure of a PCM or MCU and allowing redundant systems to boot up. This ensures that the failure of a single PCM will not result in the failure of the entire ice protection system 2.

Figure 2:
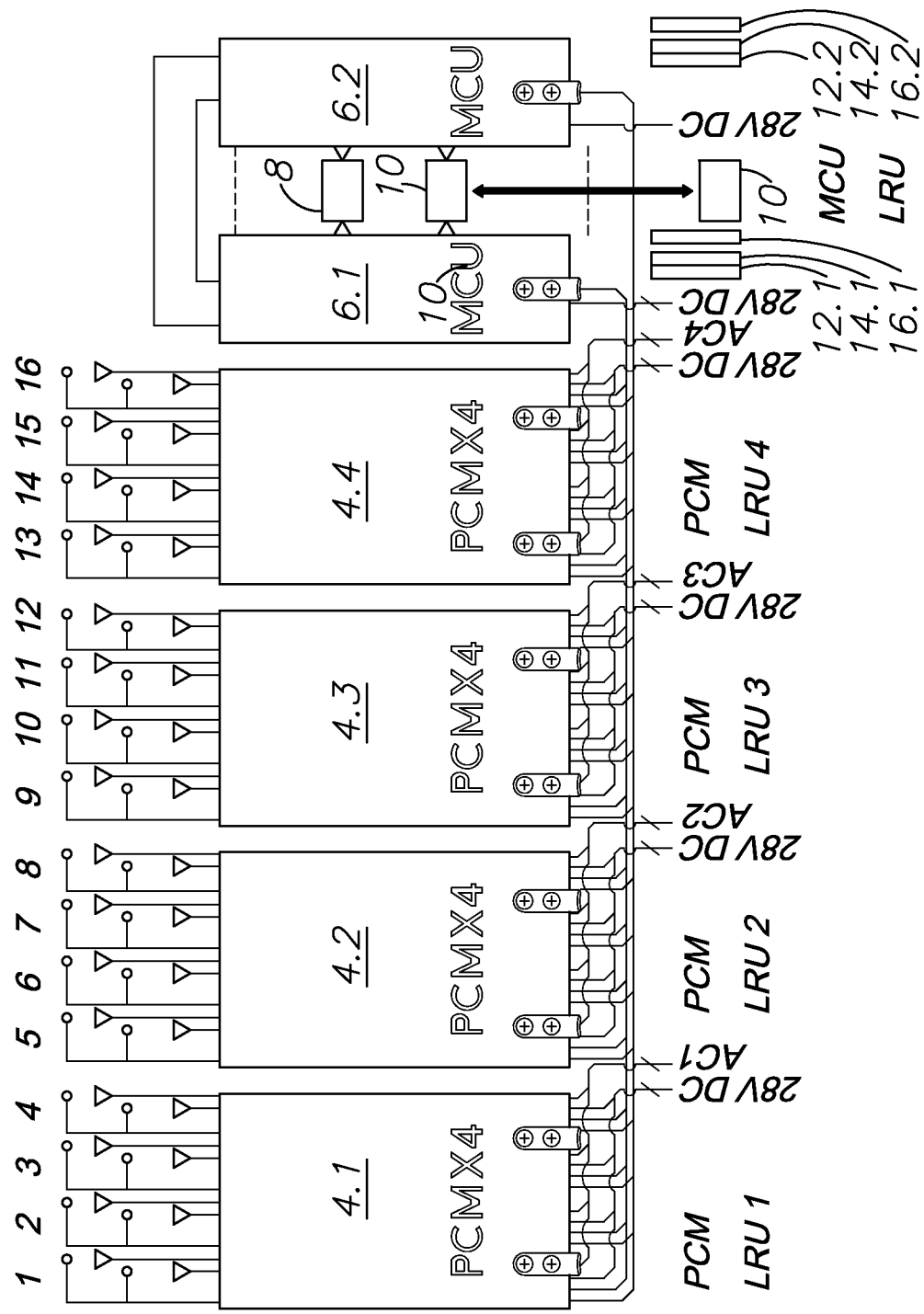
FIG. 2 is an electrical schematic diagram of an embodiment of the present invention.
Figure 3:
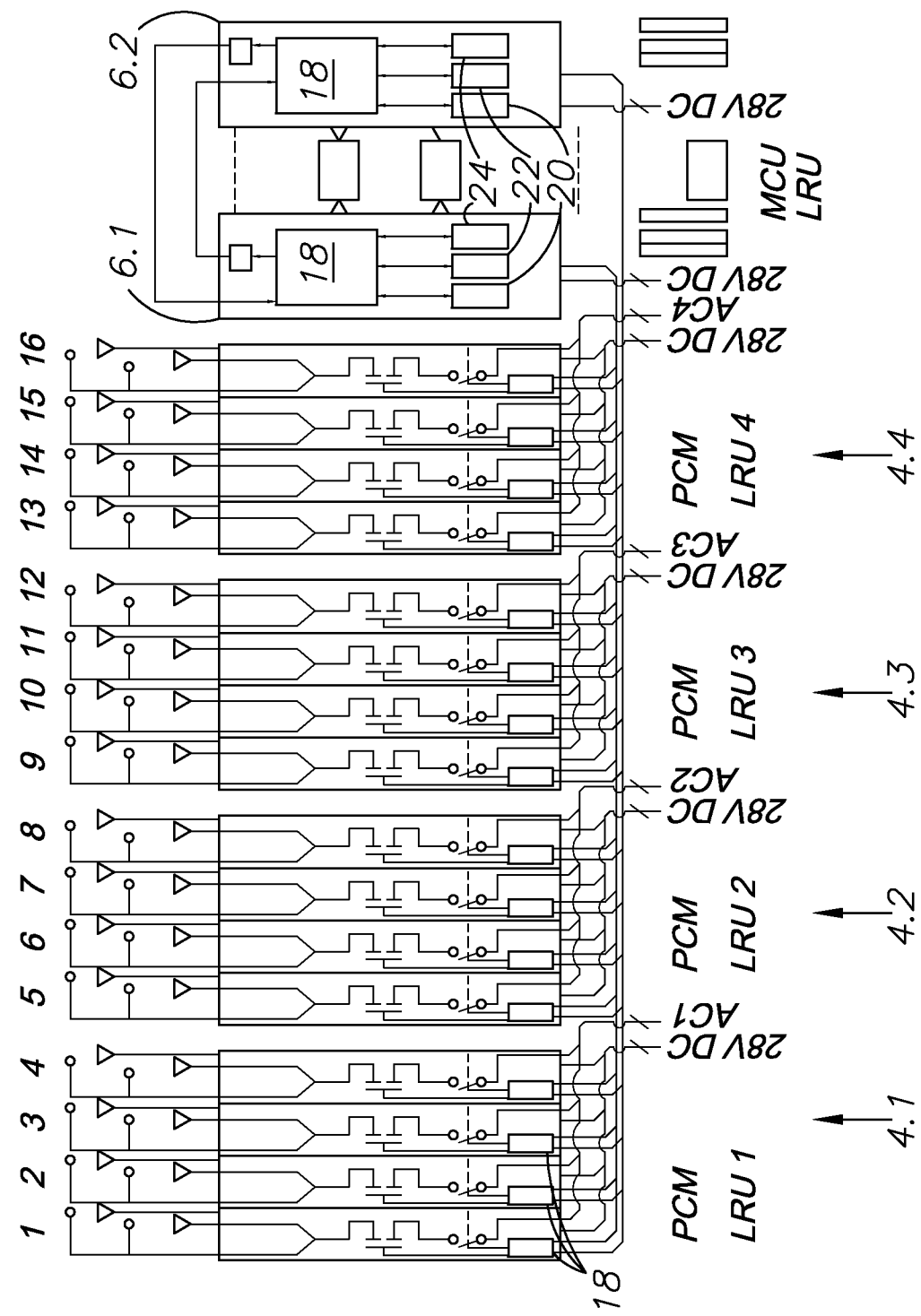
FIG. 3 is a detailed electrical schematic diagram of the controller system architecture for an embodiment of the present invention.

FIG. 1 shows the scalability of the ice protection system 2, including a set of four PCMs 4.1, 4.2, 4.3, 4.4, and a dual-redundant MCU set 6.1, 6.2. FIGS. 2 and 3 demonstrate the wiring connections between these elements and how they are integrated into the aircraft system. The first MCU 6.1 is directly connected to the ice detector via a first connection 12.1, the air data system via a first connection 14.1, and the maintenance computer via a first connection 16.1, while the second MCU is also connected to the same systems via secondary connections 12.2, 14.2, 16.2. This allows for redundant backup in the instance of failure of the first MCU 6.1. The MCUs 6.1, 6.2 further feature a discrete interface 10 for interfacing with the aircraft system, and an isolation interface 8 for interfacing with the redundant MCU.

FIG. 3 shows the component makeup of the MCUs 6.1, 6.2 and the PCMs 4.1, 4.2, 4.3, 4.4. Specifically, each MCU 6 includes a microcontroller 18, a power supply 20, a bus interface 22, and an Aeronautical Radio, Inc. (ARINC) interface 24. This allows the MCU to communicate directly with the aircraft's built in system. The PCMs 4.1, 4.2, 4.3, 4.4 each also include a microcontroller 18 for communication with the rest of the system 2.

Figure 4:
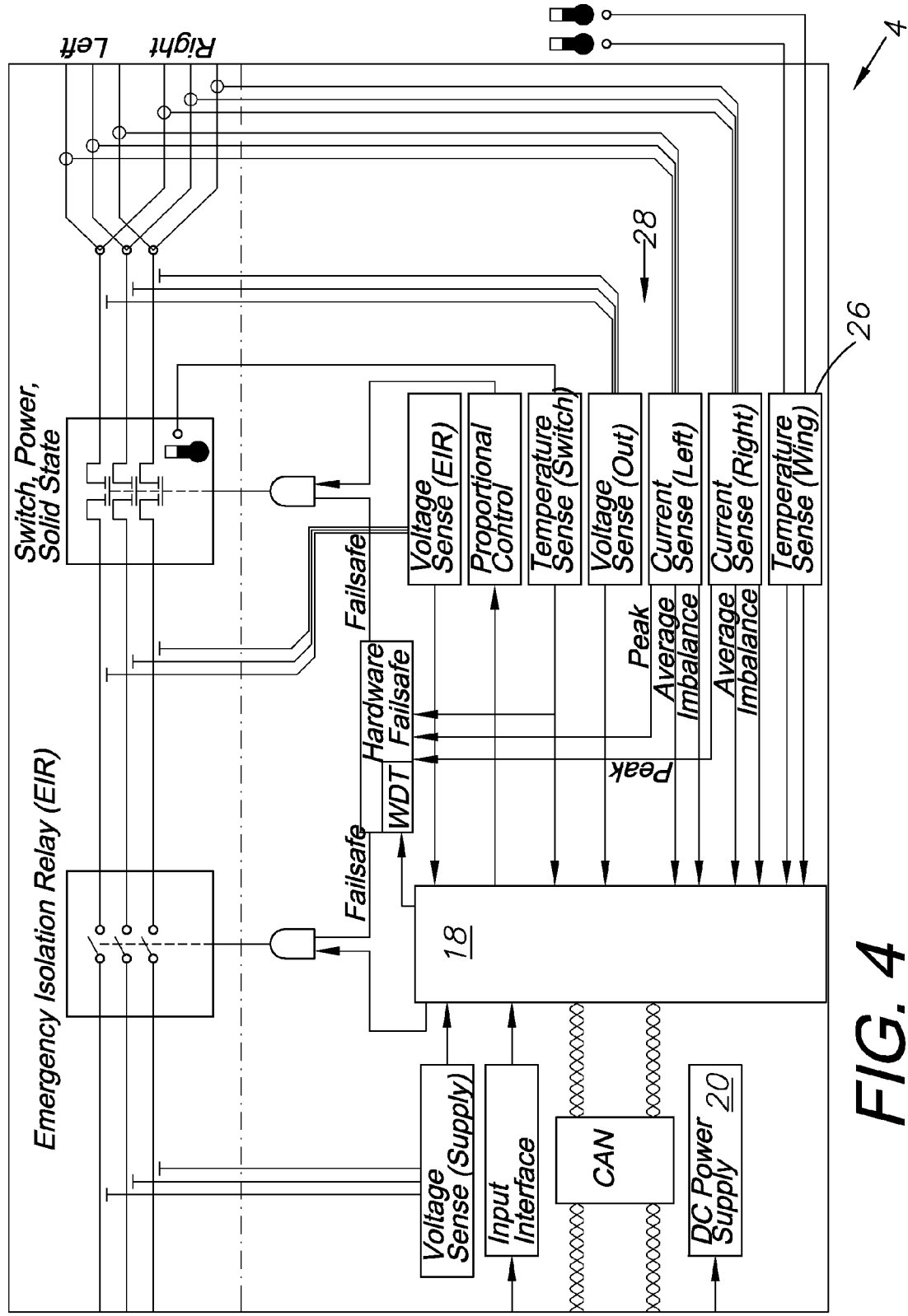
FIG. 4 is a detailed electrical schematic diagram of a power control module element of an embodiment of the present invention.

FIG. 4 is a detailed schematic of a PCM 4. The PCM includes a temperature sense switch 28 which allows the PCM to activate or deactivate the ice protection system when the temperature sensor signal 26 from the wing is received by the PCM microcontroller 18.

Figure 5:
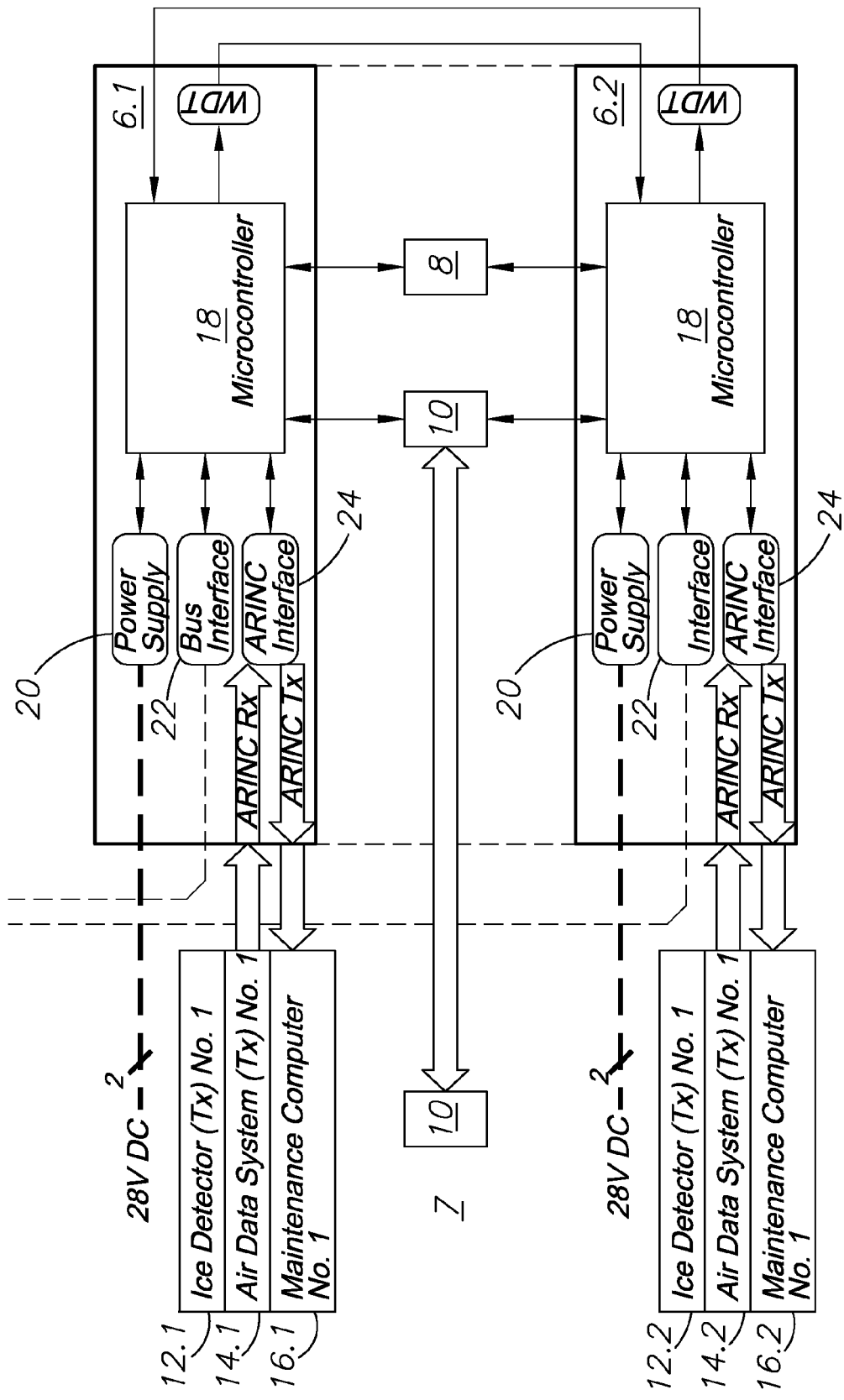
FIG. 5 is a detailed electrical schematic diagram of a master control unit element of an embodiment of the present invention.

FIG. 5 is a detailed schematic of an MCU 6, showing the connections between the MCU and the aircraft's systems 7.

III. Physical Embodiment of Ice Protection System 2

Figure 6:
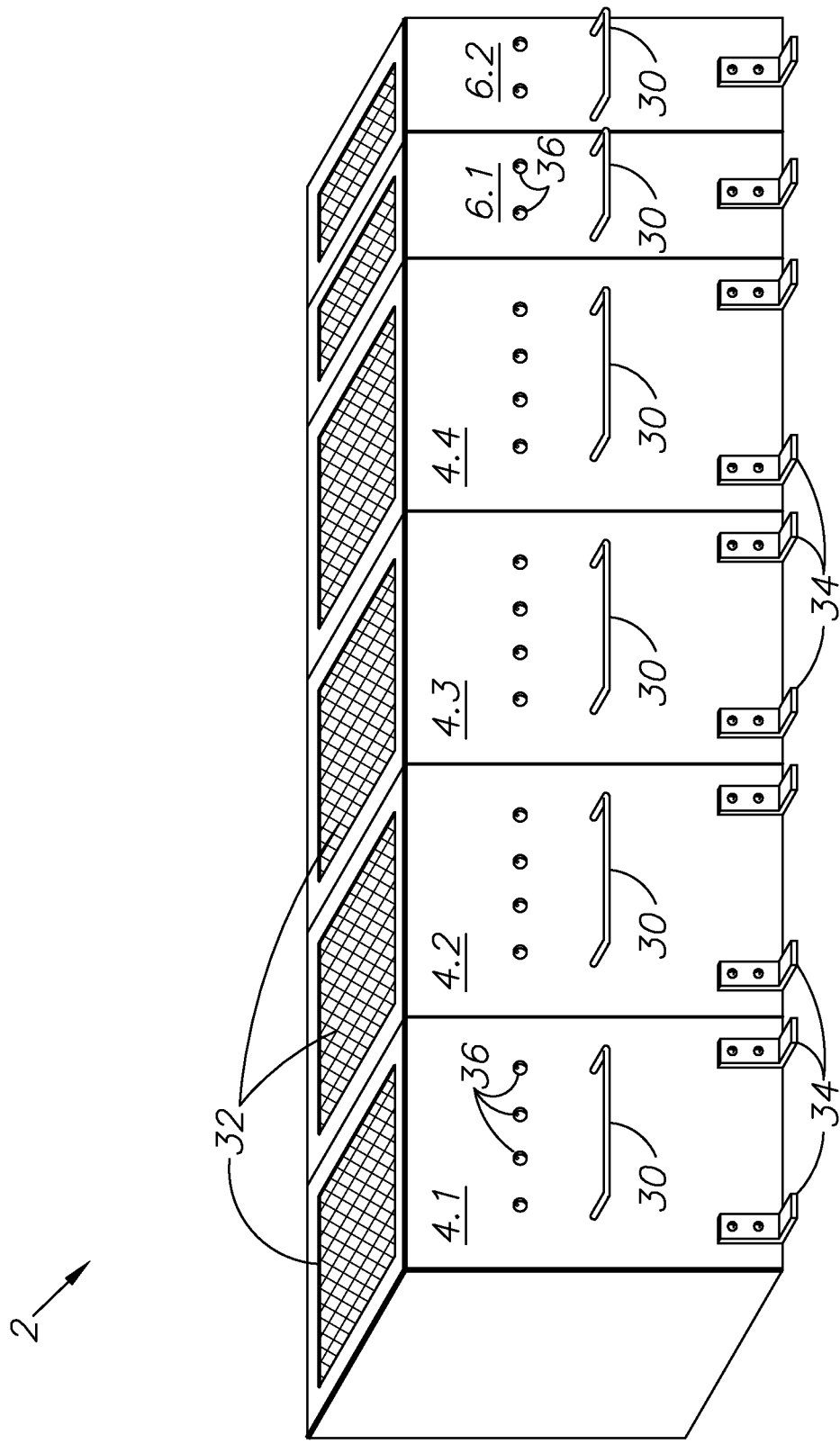
FIG. 6 is a perspective view of an example embodiment of the present invention.

FIG. 6 shows an embodiment of the ice protection system 2 defined in detail above, as it would be stored. Each PCM 4 and MCU 6 are stored in a housing. The housing will be highly resistant to temperature, shock, and corrosion. Each housing includes a transport handle 30, ventilation screen 32, and fasteners 34 for bolting the housing to a storage rack or other storage means, and indicator LEDs 36 for providing information to users or technicians monitoring the system 2.

Figure 7:
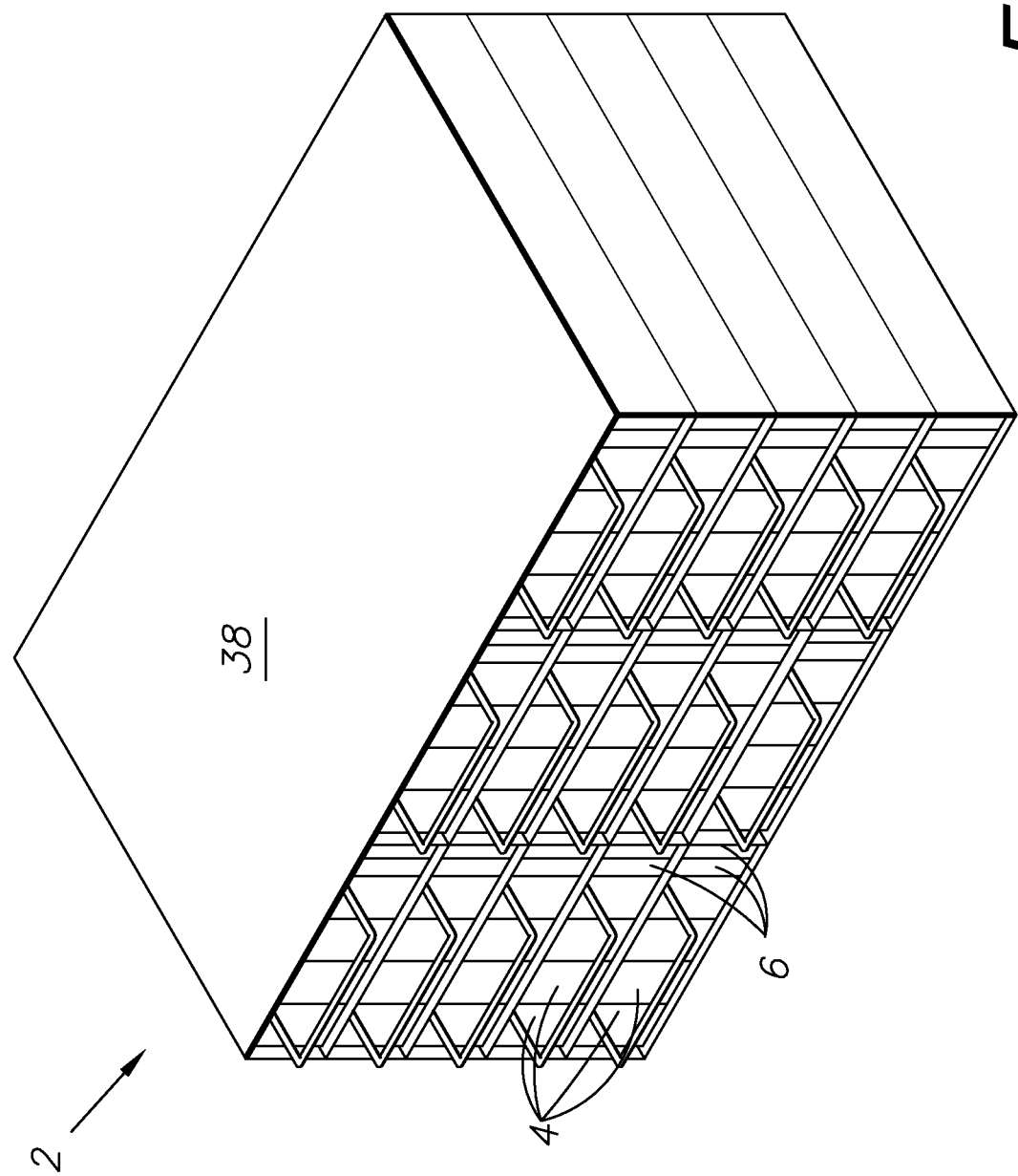
FIG. 7 is a perspective view of a rack storage system for storing multiple embodiments as shown in FIG. 6.
Figure 8:
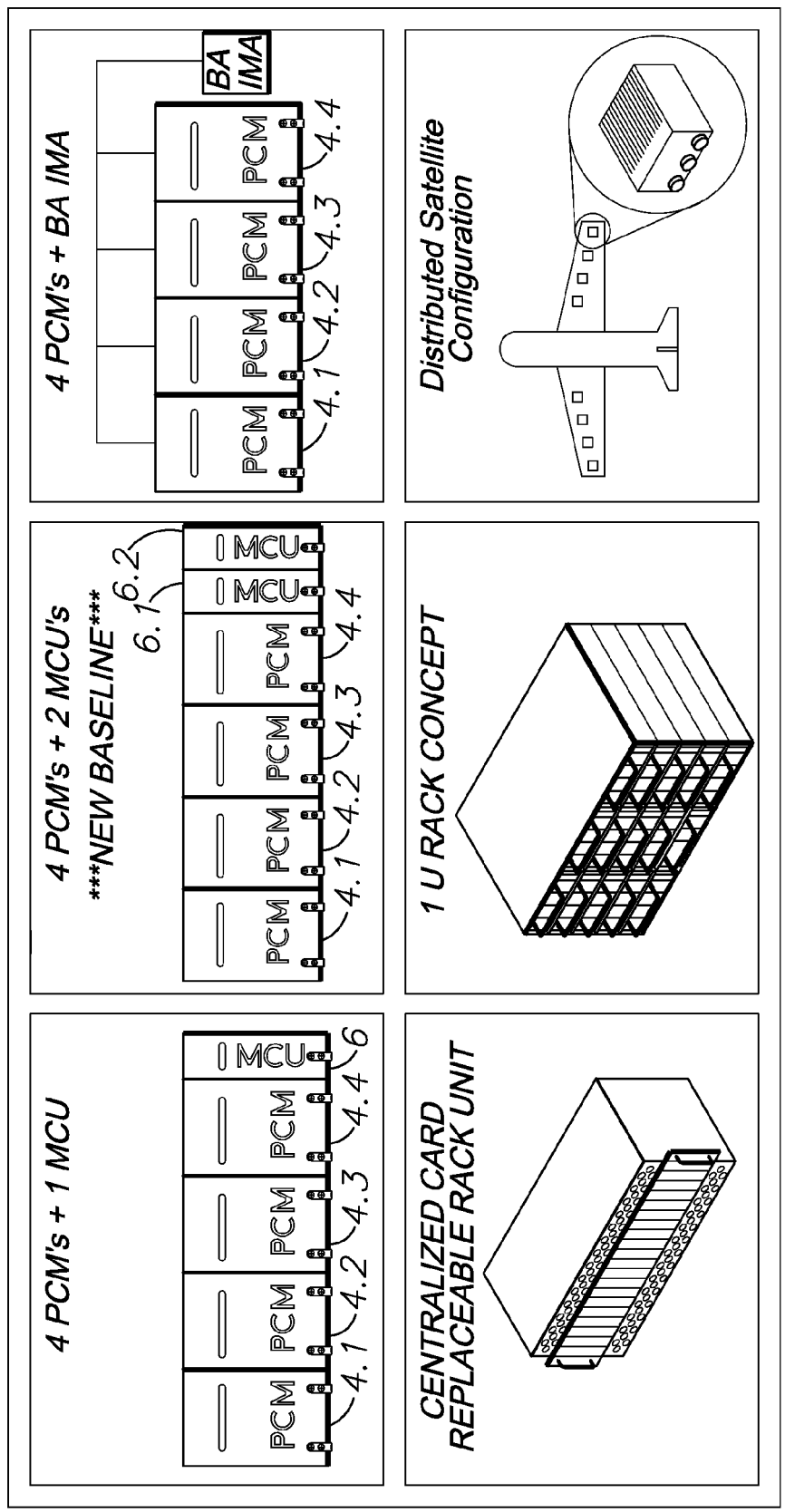
FIG. 8 is a table displaying a number of methods for organizing an embodiment of the present invention, and a plan view of an aircraft displaying heating zones.

As stated above, the PCM 4 and MCU 6 stack typically includes 4 PCM devices and one or two MCUs. These "stacks" can be mounted into a rack unit 38 as shown in FIG. 7 to service larger aircraft. Although FIG. 7 shows a large rack cabinet, the present invention could be in the form of a centralized card replaceable rack unit or other rack assembly. Views of these organizational structures can be seen at FIG. 8.

Figure 9:
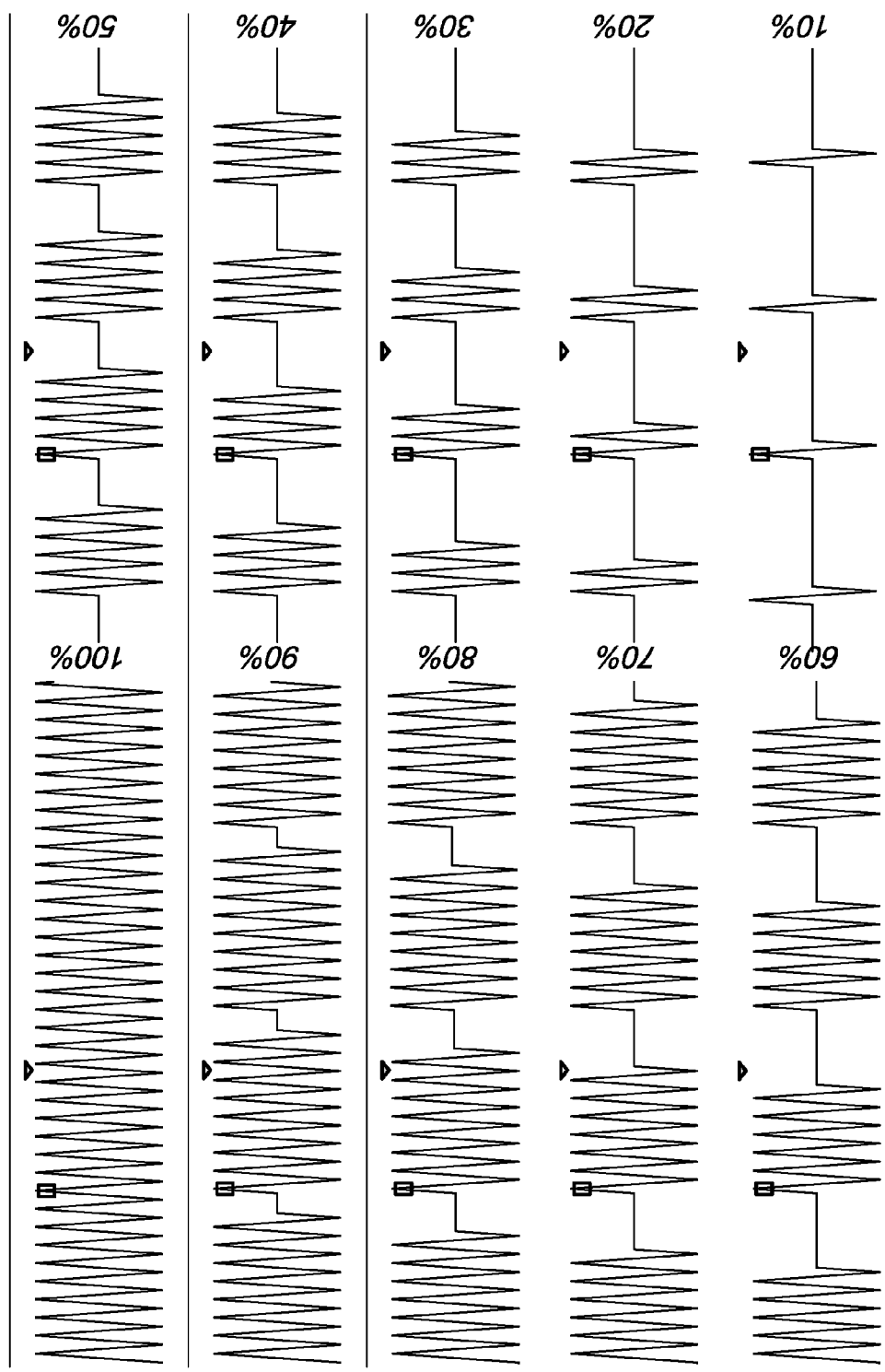
FIG. 9 is a table displaying the zero-cross proportional power control waves of an embodiment of the present invention.

FIG. 9 displays a test sample of the zero-cross proportional power control from an embodiment of the present invention.

It is to be understood that the invention can be embodied in various forms, and is not to be limited to the examples discussed above. The range of components and configurations which can be utilized in the practice of the present invention is virtually unlimited.

Having this described the invention, what is claimed as new and desired to be secured by Letters Patent is:

1. An electro-thermal ice protection system for an aircraft with an electrical power system, surfaces with multiple heating zones each including multiple heating elements, which ice protection system comprises:
   at least on master control unit (MCU) with an MCU processor, said MCU being connected to said power system and said heating elements;
   said MCU being adapted to be programmed to selectively energize said heating elements;
   said surfaces including a pair of wings;
   multiple said heating zones interspaced throughout said surface, each heating zone being associated with a respective heating element;
   a plurality of power control modules (PCMs) connected to said MCU, said PCMs including a PCM processor;
   each said PCM associated with at least one said heating element;
   each said PCM selectively instructed by said MCU to provide power to said associated heating element;
   a communication link facilitating communication between said PCMs and said MCU;
   a microcontroller adapted to interface major functional communication blocks communicating to and from said communication link;
   said PCMs being functionally isolated from each other PCM such that the fault of one PCM does not affect the operation of remaining non-faulted PCMs;
   each of said multiple PCMs being capable of feeding electrical output to a heating zone on a wing of an aircraft while simultaneously feeding electrical output to the complimentary heating zone on an opposing wing of the aircraft whereby said pair of aircraft wings are symmetrically heated;
   solid-state switching within each of said multiple PCMs configured for proportional power control;
   a dithering function in said MCU for increased control resolution of the proportional power control;
   said PCM solid-state switching configured for implementing a zero-cross proportional power control scheme and reducing EMI emissions content and harmonic content;
   a generator adapted to provide power to at least two of said multiple PCMs;
   a coordinated synchronized power control scheme configured to minimize generator shock loads when said at least two PCMs are instructed to switch simultaneously;
   said at least one MCU including an MCU microcontroller; and
   wherein a hardware failsafe circuit is used to rapidly detect and isolate selected fault conditions independently from said microcontroller.

2. The system according to claim 1, wherein said plurality of PCMs comprise modular elements which stack or scale to accommodate aircraft of varying sizes.

3. The system according to claim 1, wherein said at least one MCU is enclosed in a single housing.

4. The system according to claim 1, wherein said PCMs and MCU are arranged using a rack mount form factor.

5. The system according to claim 1, wherein said PCMs and MCU are arranged using a card replaceable form factor.

6. The system according to claim 1, wherein said microcontroller is used to provide fault diagnostics and reporting of major functional blocks within said MCU.

7. The system according to claim 1, wherein desaturation detection in the solid state switch of the PCM is used to detect and isolate fault conditions.

8. The system according to claim 1, wherein said PCM solid-state switch device temperature is monitored to detect and isolate fault conditions.

9. The system according to claim 1, further comprising:
a delta-configured load is used in conjunction with a non-standard solid-state switch architecture; and
wherein said solid switch state results in reduced power dissipation.

10. The system according to claim 1, wherein zone synchronization is provided through an interface connecting said multiple PCMs to said at least one MCU.

11. The system according to claim 1, further comprising:
a current sensor capable of measuring current with a settling time less than three AC cycles.

12. The system according to claim 1, further comprising:
a zone current sensor capable of measuring and reporting average current, imbalance current, and peak current.

13. The system according to claim 1, further comprising:
a zone current sensor capable of detecting peak currents within a period of 10 micro-seconds or less; and
wherein said zone current sensor is further capable of reporting fault detection and isolation based upon said peak currents.

14. The system according to claim 1, further comprising a composite heatsink construction adapted to provide thermal management and to reduce weight.

15. The system according to claim 1, further comprising:
built-in test circuitry capable of providing fault detection of major functional blocks within said control unit.

16. The system according to claim 1, further comprising:
said at least one MCU comprises;
a first MCU and a second MCU; and
wherein said first and second MCUs comprise a dual redundant design such that said second MCU is capable of activating upon the failure of said first MCU.

17. The system according to claim 16, wherein said first and second MCUs are enclosed in a single housing.

18. The system according to claim 16, further comprising:
wherein said first MCU is enclosed in a first housing; and
wherein said second MCU is enclosed in a second housing.

19. The system according to claim 1, further comprising:
a voltage sensor adapted to measure and report the magnitude of supply voltage.

20. The system according to claim 19, wherein said voltage is monitored at one or more of the times included in the list comprising:
on the input; between the isolation relay and solid-state switch; or after the solid state switch.

21. The system according to claim 19, wherein one or more of the voltage sensor circuits are able to measure voltage with a settling time on the order of three AC cycles or less.

22. The system according to claim 1, further comprising:
wherein said multiple PCMs are arranged into multiple PCM zones; and
wherein a plurality of input pins electronically encode a unique zone ID for each PCM zone.

23. The system according to claim 22 wherein parity is used to detect zone ID errors resulting from wiring errors or hardware failures.

24. The system according to claim 22, wherein the Hamming method is used to detect zone ID errors resulting from wiring errors or hardware failures.

* * * * *